Nov. 2, 1965     R. L. CHAMBERS     3,215,360
FISHING REEL WITH VARIABLE SPEED DRIVE
Filed Feb. 20, 1962     4 Sheets-Sheet 1
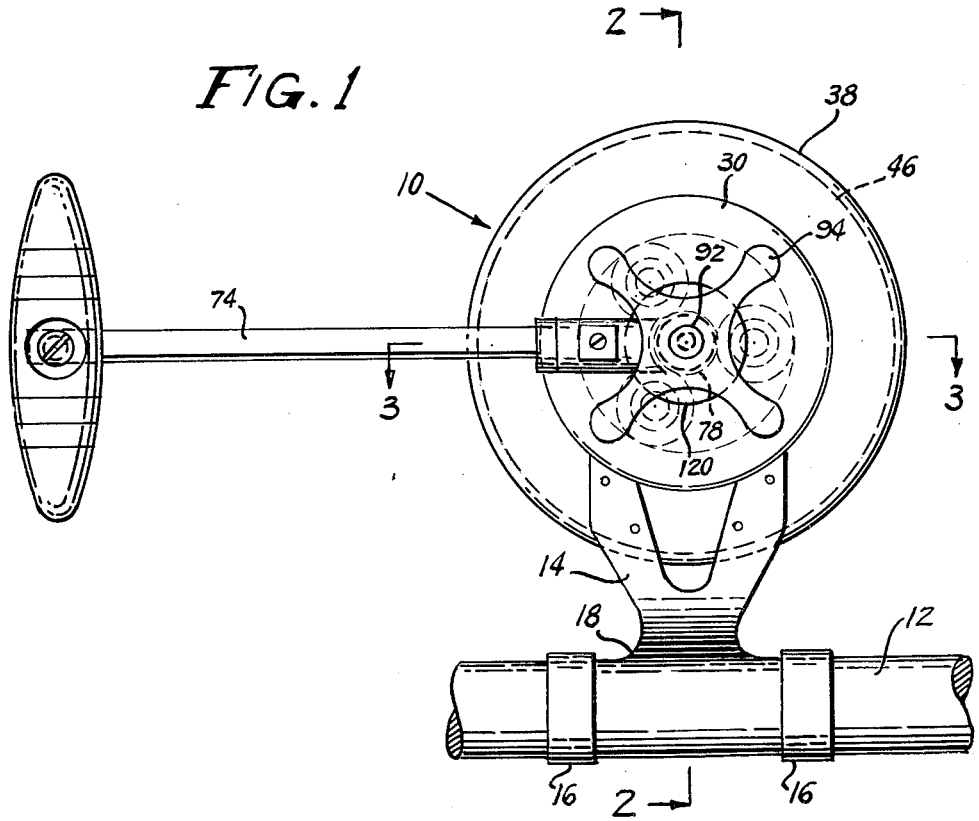
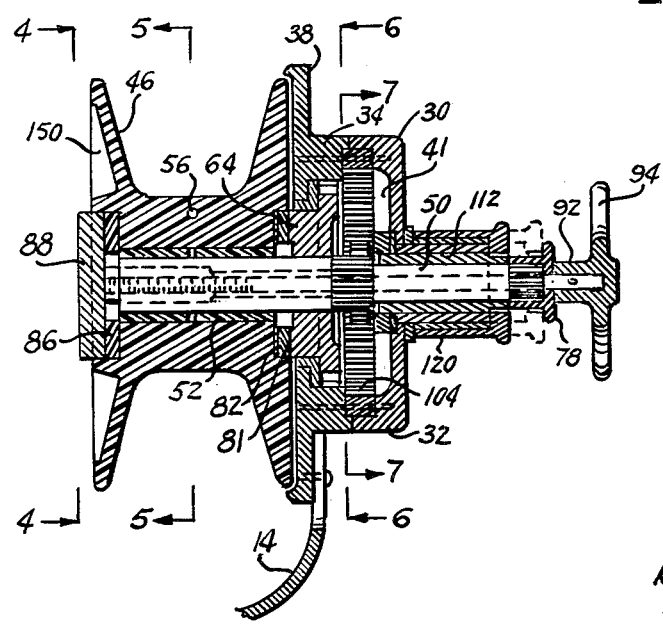
INVENTOR.
Roy L. Chambers
BY Walter S. Pawl
ATTORNEY.

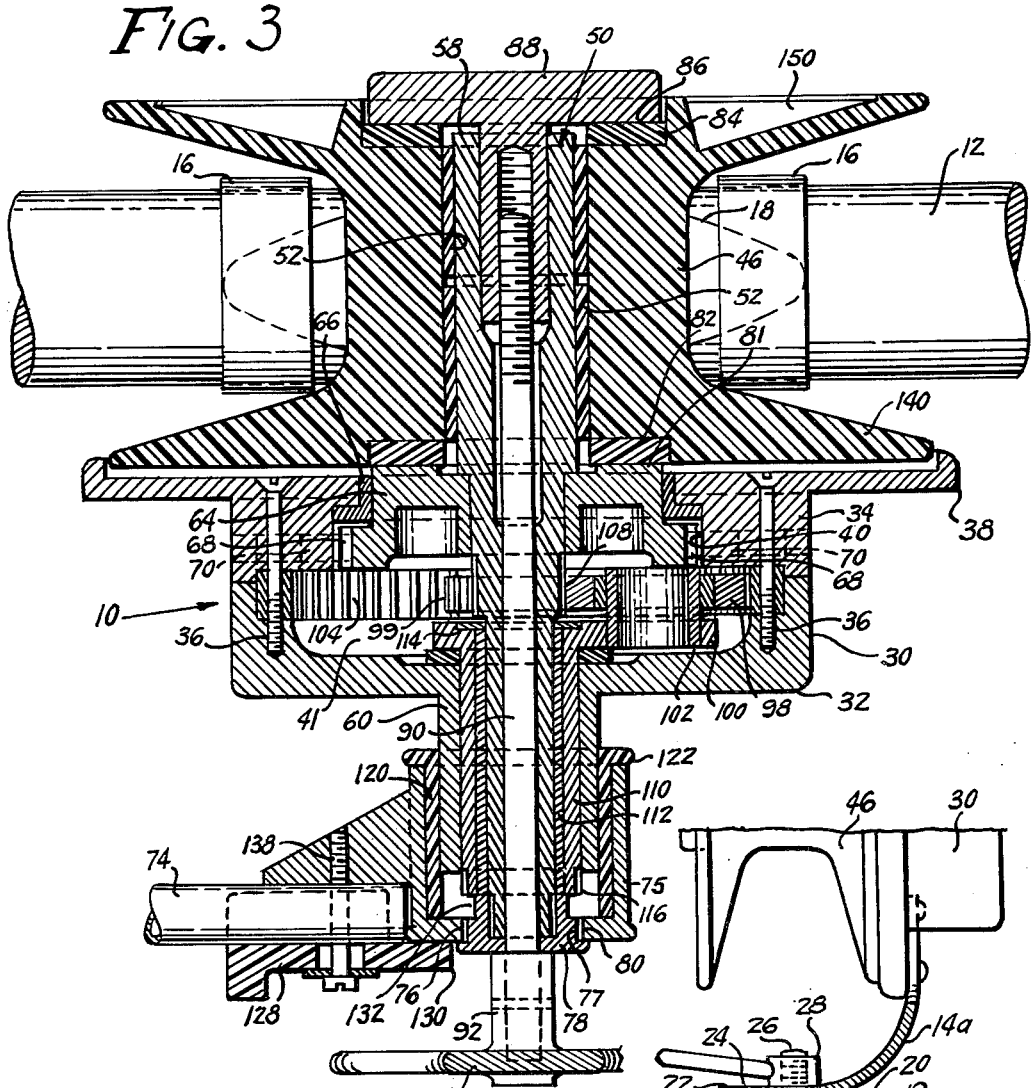
Fig. 3
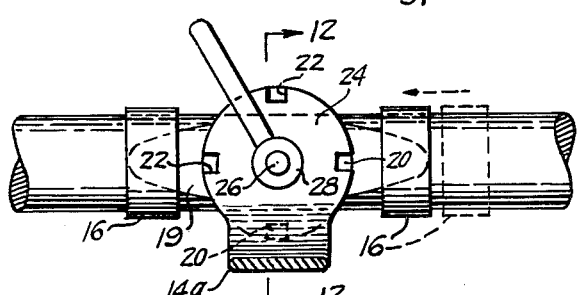
Fig. 11
Fig. 12
INVENTOR.
ROY L. CHAMBERS
BY Walter S. Paul
ATTORNEY.

Nov. 2, 1965 R. L. CHAMBERS 3,215,360
FISHING REEL WITH VARIABLE SPEED DRIVE
Filed Feb. 20, 1962 4 Sheets-Sheet 3

INVENTOR.
ROY L. CHAMBERS
BY
Walter S. Paul
ATTORNEY.

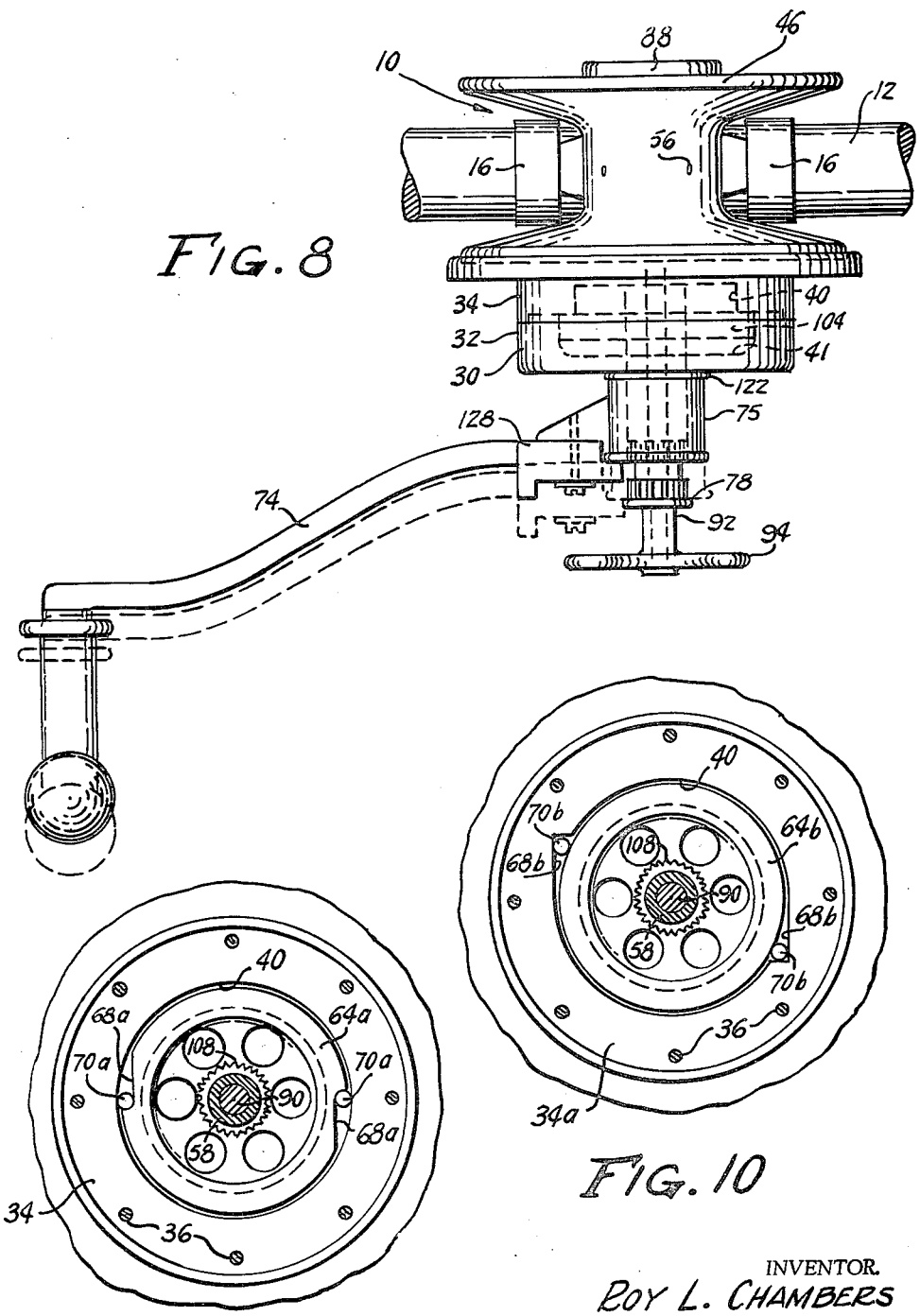

United States Patent Office 3,215,360
Patented Nov. 2, 1965

3,215,360
FISHING REEL WITH VARIABLE SPEED DRIVE
Roy L. Chambers, 2130 Windover Drive NE.,
Huntsville, Ala.
Filed Feb. 20, 1962, Ser. No. 174,583
2 Claims. (Cl. 242—84.45)

This invention relates to fishing reels.

At the present time commercially available reels are reasonably satisfactory, and they serve their intended purpose to a certain degree. However, different manufacturers' makes of reels have certain disadvantages. Some fishermen prefer the reels of one manufacturer because its reels offer features that others do not. Other fishermen prefer different reels for other reasons, for instance, excellence in manufacture. I have found that commercially available reels do not offer sufficient versatility nor sufficient ease of operation for different types of fishing, such as is possible with a reel made in accordance with my invention.

An object of my invention is to provide a reel which overcomes the above objections of limited versatility and ease of operation.

A further object of the invention is to provide a simple, very strong and easily used fishing reel which is sufficiently durable to give many years of satisfactory service.

A feature of my invention is that my reel may be used equally well in fishing in many of the customary ways well known to fishermen.

Another object of my invention is found in the multi-ratio drive for the spool of the reel, whereby a fisherman may very easily shift from one speed ratio to another, even with one hand.

A feature of my invention is the type of clutch which I use to drive the reel and to adjust the drag as the line is being paid out in normal fishing operation. I use dependable friction clutches where the desired friction is easily adjustable by simply rotating a knob, handle or the like, which is conveniently located on either (or both) sides of the reel.

There have been problems with friction brakes in reels. As the spool of the reel rotates at high speed, a considerable quantity of heat is generated at the friction surfaces. Thus, another object of my invention is to provide a large brake area in a reel for cooling the elements of the friction brake which variously functions as a brake depending on whether the fishing line is being paid out or wound onto the spool of the reel.

Another object of the invention is to provide a fishing reel as aforesaid with means enabling the reel to be selectively mounted on the rod, for example, left or right hand.

One of the benefits in having an easily adjustable brake on the spool is that the brake may be adjusted to correspond to the test of the line, thereby minimizing, if not completely obviating, line-breakage.

Another feature of my invention is that of ruggedness. I have a spool mounted for rotation on an axial spindle assembly furnishing a heavy duty arrangement that is most substantial. The fact that the spindle assembly extends through the reel spool allows me to make both the spool and spindle assembly such that it will withstand any ordinary usage and even considerable abuse without failing.

Other objects and features of importance will become apparent in following the description of the illustrated forms of the invention.

In the drawings:

FIG. 1 is a fragmentary side elevational view of a fishing rod with one of my reels mounted thereon.

FIG. 2 is a sectional view taken on the line 2—2 of FIG. 1.

FIG. 3 is an enlarged sectional view taken on the line 3—3 of FIG. 1.

FIG. 8 is a top view of my reel.

FIG. 9 is a sectional view corresponding to FIG. 6 but showing a modified form of one-way clutch.

FIG. 10 is view similar to FIG. 9 but showing a further modification of the one way clutch.

FIG. 11 is a longitudinal sectional view showing a typical way of adjustably mounting my reel on a fishing rod so that it may be used on the left or on the right. Regardless of the mounting, my reel can easily be adjusted to face the front of the rod for spin casting.

FIG. 12 is a sectional view taken on the line 12—12 of FIG. 11.

Figure 4:
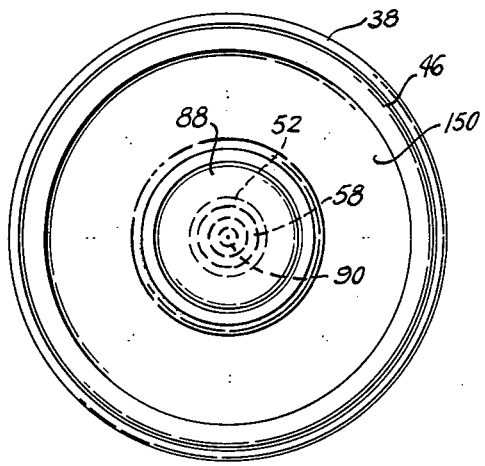
FIG. 4 is a sectional view taken approximately on the line 4—4 of FIG. 2.

FIG. 1 shows my reel 10 from the side, mounted on a conventional fishing rod 12. In this instance, the frame of reel 10 is attached by bracket 14 to rod 12 (FIGS. 1 and 2) by reel stand 18 at the lower end of bracket 14 which is fixed to the rod by ring clamps 16. Any other conventional type of mounting for the reel may be used. However, FIGS. 11 and 12 show an improvement allowing the reel to be adjusted at right angles to the rod or to face the front of the rod. In these figures I have shown a flange 19 (to which stand 18 is fixed), and the flange has a plurality of projections 20 on its top surface which are engageable in notches 22 formed at the periphery of plate 24. The plate is formed at the lower end of bracket 14 and has a hole in its center through which spindle bolt 26 extends. The spindle bolt is anchored to the reel stand 18 and has a nut 28 thereon. Thus, it is now evident that when the nut 28 is loosened, plate 24 can be elevated slightly and turned to any position at which the projections 20 on the reel stand engage notches 22. Since the reel is supported by the bracket 14, the entire reel may be turned to any selected position as governed by the location of the notches 22, and it may be locked in place with respect to the fishing rod by tightening the nut 28. This feature of my invention may be used with all of the different modifications and forms of my reel.

The main frame 30 of the reel is stationarily fixed with respect to the fishing rod. The frame is composed of several pieces attached together to form a unitary structure. It is understood that in manufacture it is necessary to make the frame in several pieces because it contains gears and other parts, but the precise casting, machining of pieces, etc., may be varied. To exemplify the frame, I have two frame members 32 and 34 connected by bolts 36 (FIG. 3), and the frame members have confronting internal cavities to define a chamber 41.

Figure 5:
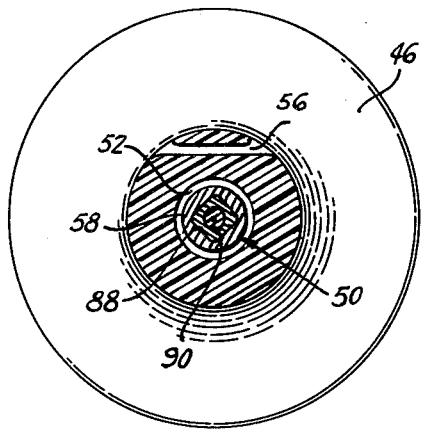
FIG. 5 is a sectional view taken on line 5—5 of FIG. 2 and showing particularly the mounting of the spool on the main spindle assembly of the reel which forms a part of the brake adjusting feature.

Spool 46 is mounted for rotation on a main spindle assembly 50 (FIG. 3), and for this purpose I have a sleeve bearing 52 between the spindle assembly and the inner surface of the bore of spool 46. Opening 56 (FIG. 5) in the spool 46 allows the fishing line to be fastened to the spool. Spindle assembly 50 is composed of a hollow shaft 58 disposed in sleeve bearing 52 and having a reduced diameter portion extending through the center of chamber 41 and through the journal 60 located at the central axis of chamber 41. Assembly 50 has a collar at one end, coupled by splines 80 to shaft 58. A circular member 64, located in chamber 41, is mounted on hollow shaft 58. It is rotatable in a bushing 66 pressed in or otherwise located in an opening in the center of the frame member 34.

Figure 6:
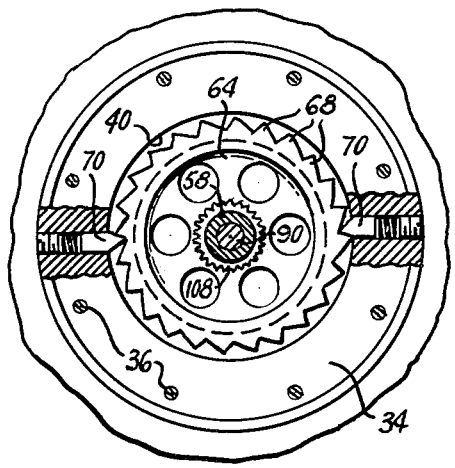
FIG. 6 is a sectional view taken on line 6—6 of FIG. 2 and showing one form of one way clutch used in my reel.

There are teeth 68, serrations, or the equivalent on the periphery of the member 64, and one or more one-way clutches, for instance, the ratches and pawls 70 (FIG. 6) associated therewith. Alternatively, I may use pins 70a in inclined slots 68a between member 64 and frame member 34. This is shown in FIG. 9. FIGURE 10 shows the same parts as in FIG. 9 but instead of having slots in member 64a, they are in the frame member 34a. The one way clutches shown in FIGS. 6, 9 and 10 are substantially equivalent. They serve the same purpose, however, the arrangements shown in FIGS. 9 and 10 allow for simpler left-hand or right-hand adjustment.

It is now possible to understand how spool 46 is driven when crank 74 is turned as explained below. The crank has provision for adjustment in order to change speed ratios, but this feature is ignored for the moment. In fact, a simple form of my invention would omit the speed change feature. Crank 74 has a boss 75 at its inner end, and there are internal teeth 76 (FIGURE 3) on the boss. Assume that the crank 74 is in the axial position shown in FIG. 3 at which the internal teeth 76 engage the external teeth 77 of collar 78 so that when the crank 74 is turned there is a direct drive, i.e., one-to-one drive between the crank rotation and shaft assembly 50 through gear 78. Member 64 is allowed by the one-way clutch 68, 70 to rotate in the direction that we are assuming that the shaft assembly 50 is being turned, i.e., to wind the fishing line on spool 46. Thus, the friction surface 81 of member 64 engaging the friction surface of brake disk 82 recessed and fixed by conventional means in one face of spool 46, establishes a drive connection between shaft rotation and the spool 46. In addition, friction plate or disc 84 is recessed in the opposite face of spool 46 and it is frictionally coupled with brake disk 86. A square, hex, splined or keyed nut 88 of considerable length (FIG. 3) is located in the bore of hollow shaft 58, and has an axially disposed bolt 90 threaded therein. The nut 88 may have any other keying configuration instead of being square as shown. The end of the bolt is shouldered as at 92 and has a handle 94, knob or the equivalent connected therewith. The shoulder 92 bears against the outer face of the previously mentioned collar 78 so that when the bolt 90 is turned in one direction, the noncircular (in cross section) nut 88 is placed in tension thereby increasing the frictional drag between the pairs of brake members 84, 86 and 81, 82. This allows the fisherman to pre-set the maximum torque by adjusting the screw 90. Thus, the torque of the reel spool 46 is adjustable in accordance with the desires of the user, with the advantage of enabling the fisherman to adjust the friction to correspond to the fishing line strength, for instance, from 20 lbs. to 180 lbs. test. By having graduations on the face of the splined collar 78 or in some other convenient place, together with a suitable pointer, mark, etc. on the shoulder part of bolt 90, the fisherman may adjust the friction to correspond to the given fishing line which he is using.

Figure 7:
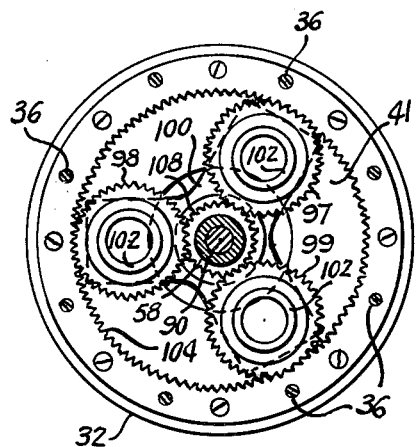
FIG. 7 is a sectional view taken on the line 7—7 of FIG. 2 and showing planetary gearing which constitutes a portion of my ratio changing mechanism for driving the spool.

The above operational description is for a direct drive between rotation of the crank 74 and spool 46. However, for more versatility, I can have (as shown) provision for an additional speed ratio or ratios. The planetary gearing shown in FIG. 7 constitutes a portion of the means to serve this purpose. The planetary gearing consists of three gears 97, 98 and 99 mounted on a spider 100 by means of hollow spindle 102 (FIGS. 3 and 7). Ring gear 104 is stationary with respect to the main frame of the reel, for example, by being held by screws 36 in a groove which opens into cavity 41. Shaft 58 has a set of teeth 108 enmeshed with the gears 97 and 99 (the number of these gears can be increased or decreased). Thus, by rotating the spider 100 and having the ring gear 104 fixed, hollow shaft 58 together with member 64 are rotated through the planetary gearing so as to have a different ratio from the one to one described before. A six-to-one ratio has been found to be quite useful for the second option, although any ratio i.e. 3½ to 1, 5 to 1, etc. could have been just as easily selected.

I drive the spider 100 as follows: A concentric shaft 110 is mounted on a sleeve bearing 112 coaxial with hollow shaft 58 and held in place by conventional retainer 114. The shaft 110 has a set of teeth 116 at its outer end, these teeth being the same as teeth 76. The crank 74 is mounted on a cylindrical slide 120 with an inner flange 122. The slide 120 is capable of axial sliding movement on journal 60 from the position shown in FIG. 3 to the position shown in FIG. 8. When in the position shown in FIG. 8, teeth 76 are engaged of teeth 116 so that upon rotation with crank 74, a drive connection is established with the spool 46, by way of shaft 110, spider 100, its gears, teeth 108, member 64 and the previously mentioned friction surfaces of the brake members 81, 82 and 84, 86. The spider for the idler gear drive can drive the idler gears as shown. However, I can drive the internal ring gear with the idler gears mounted on the reel housing thereby causing the spool to rotate in the opposite direction.

I have a latch 128 in the form of a sliding saddle on the inner end of the crank 74. The end 130 of the sliding saddle is engageable in the space 132 between collar 78 and hollow shaft 110 to hold the handle in one axially adjusted position, i.e., with the teeth 76 engaged with teeth 116. The other position of latch 128 is with end 130 over the end of collar 78. The sliding saddle latch 128 is suitably supported, for instance, by a bolt 138 so that it is capable of limited sliding movement on the handle 74 whereby end 130 may be moved into and out of space 132 and over the end of collar 78, respectively.

The materials from which friction plates 82 and 84 are made can be varied. For example, I may use nylon, Teflon, brass, conventional brake lining material or automotive friction clutch plate material, etc. Regardless of the material selected, since I rely on friction for braking, heat is generated but there is more than enough area to dissipate the heat. Side flanges 140 and 150 on the spool provide additional heat-dissipation area to help cool the friction members when operated under a heavy load, since the spool is generally made of good heat-conductive metal or plastic material Summarizing the operation of the reel, assume that the fishing line is payed out and a fish strikes. Spool 46 will rotate causing additional line to be payed out and the rotation is permissive only because the brake members 81, 82 and 84, 86 slip. The member 64 cannot rotate because of the one way clutch 68, 70 and thus provides a reaction for the braking action that is required to produce drag. If the drag is adjusted by the fisherman, he need only turn the handle 94 thereby increasing the friction between the brake members 84, 86 and 81, 82.

Now assume that the fisherman desires to reel in the line. Crank 74 is rotated and this rotation is imparted to the spool 46 at a one-to-one or greater ratio depending on the axial setting of the crank 74. This phase has been described previously, although, it is noted that for direct drive hollow shaft 50 is directly rotated through collar 78 thereby causing the member 86 to rotate because nut 88 is square (see FIG. 5). Thus, the friction between members 84 and 86 drives the spool 46. For the indirect drive at a different speed ratio, the hollow shaft 110 is driven by crank 74, and the drive is through the planetary gearing as discussed previously.

It is understood that various changes and modifications may be made without departing from the protection of the following claims.

What is claimed is:

1. A fishing reel comprising a frame having walls defining a cavity, a spindle assembly rotatably carried by said frame, the first of said frame walls having an opening coaxial with said spindle assembly, a first rotary member mounted in said opening and supporting said spindle assembly intermediate the ends thereof, the second of said frame walls having a second opening coaxial with and spaced from said first rotary member, a second rotary member in said second opening supporting said spindle assembly, said spindle assembly extending beyond said first wall of said frame, a spool mounted on one end of said spindle assembly exteriorly of said frame, means providing friction surface means between said first rotary member and one face of said spool, means providing additional friction surface means on the opposite face of said spool, brake means between said first rotary member and said frame to prevent rotation of said first member in the direction corresponding to unwinding of the line, an elongated adjusting member coaxial with said spindle assembly for adjusting the frictional drag between said friction surface means when the line is in extended condition, a handle axially slidably mounted on the opposite end of said spindle assembly, a first spindle assembly coupling means mounted on the opposite end of the spindle assembly, a handle coupling means carried by said handle and engageable with said first spindle assembly coupling means to provide a direct drive between said spool and said handle through said spindle assembly, a second spindle assembly coupling means carried by said second rotary member and selectively engageable with said handle coupling means to drivingly connect said handle and said second rotary member, and gear transmission means located in said cavity and reacting with stationary gear means on said frame, whereby said spool can be selectively driven from said handle by said first spindle assembly coupling means or said second spindle assembly coupling means.

2. The structure of claim 1 in which said transmission means is a planetary gear assembly.

References Cited by the Examiner
UNITED STATES PATENTS

| | | | |
|---|---|---|---|
| 2,132,548 | 10/38 | Stockwell et al. | 242—84.54 |
| 2,150,088 | 3/39 | White | 242—84.44 |
| 2,182,423 | 12/39 | Cabassa. | |
| 2,220,519 | 11/40 | Grieten | 242—84.44 |
| 2,298,481 | 10/42 | Hayes | 242—84.45 |
| 2,550,271 | 4/51 | Kagel | 242—84.2 |
| 2,615,352 | 10/52 | Mies et al. | 242—84.1 X |
| 2,783,952 | 3/57 | Clay | 242—84.21 |
| 3,017,135 | 1/62 | Wood | 242—84.54 |
| 3,033,485 | 5/62 | Shearer | 242—84.54 X |

FOREIGN PATENTS 833,556    7/38    France.

MERVIN STEIN, *Primary Examiner.*

HARRISON R. MOSELEY, RUSSELL C. MADER,
*Examiners.*